(12) United States Patent
Ripley (10) Patent No.: US 10,449,572 B2
(45) Date of Patent: Oct. 22, 2019

(54) HOUSEHOLD HAZARDOUS WASTE RECOVERY

(71) Applicant: Pass/Fail Ventures LLC, Austin, TX (US)

(72) Inventor: Christopher Barnard Ripley, Lichtfield, CT (US)

(73) Assignee: Waste Repurposing International, Inc., Austin, TX (US)

( * ) Notice: Subject to any disclaimer, the term of this patent is extended or adjusted under 35 U.S.C. 154(b) by 0 days.

(21) Appl. No.: 14/971,718

(22) Filed: Dec. 16, 2015

(65) Prior Publication Data

US 2017/0174439 A1 Jun. 22, 2017

(51) Int. Cl.
*B07C 5/34* (2006.01)
*B65G 43/08* (2006.01)
*B07C 5/342* (2006.01)
*B65F 1/00* (2006.01)

(52) U.S. Cl.
CPC ............ *B07C 5/3412* (2013.01); *B07C 5/342* (2013.01); *B65G 43/08* (2013.01); *B07C 2501/0054* (2013.01); *B65F 1/0053* (2013.01); *B65F 2001/008* (2013.01)

(58) Field of Classification Search
CPC .......... B07C 5/3412; B07C 2501/0054; B07C 5/342; B65F 2210/168; B65F 2001/008; B65F 1/0053
See application file for complete search history.

(56) References Cited

U.S. PATENT DOCUMENTS

| | | | |
|---|---|---|---|
| 4,244,650 A | 1/1981 | Garfunkel | |
| 4,414,566 A | 11/1983 | Peyton | |
| 5,100,005 A | 3/1992 | Noble et al. | |
| 5,119,894 A * | 6/1992 | Crawford | B65F 1/1484 177/139 |
| 5,148,739 A * | 9/1992 | Fox | B09B 3/0025 100/215 |
| 5,186,336 A | 2/1993 | Pippin | |
| 5,314,072 A | 5/1994 | Frankel | |
| 5,447,017 A | 9/1995 | Becher et al. | |
| 5,794,788 A | 8/1998 | Massen | |
| 6,097,995 A * | 8/2000 | Tipton | G05B 15/02 700/266 |
| 7,119,689 B2 * | 10/2006 | Mallett | B07C 7/005 340/572.1 |

(Continued)

FOREIGN PATENT DOCUMENTS

WO     2012069839     5/2012

OTHER PUBLICATIONS

PCT/US16,67369, "International Search Report and Written Opinion", dated May 3, 2017, 9 pages.

*Primary Examiner* — Thomas Randazzo
(74) *Attorney, Agent, or Firm* — Cesari & Reed LLP; R. Michael Reed (57) ABSTRACT

In certain embodiments, a system includes at least one optical sensor configured to capture one or more optical data associated with packaging of a waste product and a processor coupled to the at least one optical sensor. The processor may be configured to determine information about the waste product based on the optical data and send a signal corresponding to the information to one of a destination device and a controller based on the determined information.

20 Claims, 10 Drawing Sheets

(56) References Cited

U.S. PATENT DOCUMENTS

| | | | |
|---|---|---|---|
| 7,264,124 B2 | 9/2007 | Bohlig | |
| 7,380,386 B2 | 6/2008 | Spatafora | |
| 7,416,142 B2* | 8/2008 | Baker | B07C 5/122 100/225 |
| 7,501,951 B2 | 3/2009 | Maruca et al. | |
| 7,511,234 B1* | 3/2009 | Ebinger | G01G 19/021 177/132 |
| 7,562,025 B2* | 7/2009 | Mallett | B07C 7/005 705/308 |
| 7,564,943 B2* | 7/2009 | Sommer, Jr. | G01N 23/06 250/390.04 |
| 7,809,194 B2 | 10/2010 | Zhang | |
| 7,893,378 B2 | 2/2011 | Kenny | |
| 8,195,328 B2* | 6/2012 | Mallett | A61L 11/00 700/236 |
| 8,459,461 B2 | 6/2013 | Borowski et al. | |
| 8,584,867 B2 | 11/2013 | Gould | |
| 9,067,245 B2* | 6/2015 | Hubbell | B07C 5/3412 |
| 9,114,435 B2* | 8/2015 | Despres | B07C 5/38 |
| 9,120,131 B2* | 9/2015 | Sundholm | B07C 5/3412 |
| 9,315,344 B1* | 4/2016 | Lehmann | G06Q 10/08 |
| 9,316,537 B2* | 4/2016 | Bamber | G01J 3/00 |
| 9,381,546 B2* | 7/2016 | Miyasaka | B29B 17/02 |
| 9,405,992 B2* | 8/2016 | Badholm | B07C 5/3412 |
| 2006/0036407 A1 | 2/2006 | Smith | |
| 2007/0132842 A1 | 6/2007 | Morris | |
| 2008/0257795 A1 | 10/2008 | Shuttleworth | |
| 2010/0222917 A1 | 9/2010 | Bohlig | |
| 2011/0060451 A1 | 3/2011 | Borowski et al. | |
| 2013/0168300 A1* | 7/2013 | Malone | G07F 7/0609 209/583 |
| 2014/0050397 A1 | 2/2014 | Badholm | |
| 2014/0305850 A1* | 10/2014 | Serjeantson | B07C 3/08 209/546 |
| 2014/0343720 A1* | 11/2014 | Danelski | B65G 43/08 700/225 |
| 2015/0034534 A1 | 2/2015 | Mallet | |
| 2015/0081090 A1 | 3/2015 | Dong | |
| 2015/0372753 A1 | 12/2015 | Jovicic | |

* cited by examiner

HOUSEHOLD HAZARDOUS WASTE RECOVERY

FIELD

The present disclosure is generally related to devices, systems, and methods of household hazardous waste (HHW) recovery, and more particularly, to devices systems and methods of identifying and sorting HHW products, such as household hazardous waste.

BACKGROUND

Waste products may be processed and separated into different categories. Certain types of products, such as chemical products, paint products, and other products (including those that cannot be identified), may sometimes be classified as hazardous waste products, which cannot be disposed of in a landfill. Once classified as hazardous waste, such products are typically burned.

For example, this past year, approximately five hundred thirty thousand tons of HHW (e.g., laundry detergent, motor oil, bleach, and the like) were processed at collection facilities. Such items are safe enough to place on store shelves and to allow consumers to purchase them without a license and to transport them in a standard automobile. However, once such items reach the waste collection facility, such items are typically classified as hazardous and are burned, which process is environmentally questionable and very expensive.

SUMMARY

In certain embodiments, a system includes one or more optical sensors configured to capture optical data of a waste product, including bar codes (if any) associated with the packaging of the waste product. The system may further include a scale configured to determine a weight of each waste product. Further, the system may include a processor configured to determine information about the waste product from the optical data and the weight and to sort the waste product into a selected storage area based on the determined information. When the waste product is identified from the information, the system may automatically re-classify the waste product as non-hazardous (if appropriate) and may group the waste product with other similarly re-classified waste products.

In certain embodiments, these grouped waste products may be mixed, packaged, toted, and sold for re-use, diverting large quantities of waste products that would previously have been destined for burning into a recycled product that can be re-used. In certain embodiments, such grouped waste products may be diverted to a less expensive disposal option than if the products were burned. In an example, some products may be recycled, diverted for re-use at a waste treatment facility (e.g., bleach), buried, or otherwise disposed of in a manner that may reduce overall cost of processing such waste products.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of systems, methods, and devices are described below that may be used to intercept HHW products before they are destroyed (through burning or other waste elimination techniques). In certain embodiments, an apparatus includes at least one optical sensor configured to capture optical data associated with the packaging of an HHW product. The apparatus may further include an image processing circuit configured to receive and process the optical data to determine composition information corresponding to the HHW product. Once determined, the apparatus may sort the HHW product into a bin including other HHW products of similar chemical makeup. In certain embodiments, the apparatus may also include a scale to weigh the HHW product.

In certain embodiments, a device may include one or more scales; one or more conveyors, one or more optical sensors (cameras, bar code readers, other optical devices, or any combination thereof), and processing circuitry. In certain embodiments, the processing circuitry may be configured to identify an HHW product based on the optical data, to correlate with each HHW product a weight determined by the one or more scales, and to selectively control one or more actuators to sort the HHW product into a bin or onto a palette that includes other similar products. In certain embodiments, the processing circuitry may be configured to communicate with one or more databases to identify the HHW product by comparing data derived from the optical data to data stored in the database. In an example, a bar code, a SKU, a product name, or other data may be determined from the optical data, and the database may be searched to identify the HHW product based on such data.

In certain embodiments, the processing circuitry may be configured to generate a report, which may be sent to a company corresponding to the product to request identifying information. In some embodiments, the report may be sent to the company via the Internet. In some embodiments, the report may be used to search various data sources, such as websites and other sources of information (over the Internet, for example). Further, in some embodiments, the report may be used to solicit assistance from the general public, such as by posting image data and other information on a social media website and requesting that user's provide information about the product. Received information may be verified manually and then may be used to supplement the database. In some embodiments, the processing circuitry may be configured to automatically search one or more data sources based on the report to attempt to identify the HHW product.

In certain embodiments, a method may include capturing optical data associated with an HHW product and searching a data source for identification information corresponding to the HHW product based on data derived from the optical data. When the identification information is found, the method may include weighing the HHW product and sorting the HHW product into a bin or onto a palette including other similar HHW products. When the identification information is not found, the method may include sorting the HHW product onto a palette of other unknown products and producing a report including the optical data and weight data corresponding to the HHW product.

In some embodiments, a method of HHW recovery may include presenting the HHW product to one or more optical sensors (such as bar code readers, cameras, and so on). Optical data determined by the optical sensors is provided to a processor, which may search one or more data sources based on the optical data to locate the HHW product. In certain embodiments, when the HHW product is located, an audio element may emit a tone or sound, which may be similar to the sound produced by bar code scanners at a grocery store. The processor may also return information to the system indicating a bin into which the product should be sorted. In some embodiments, the product may move along a conveyor system and through a "laser fence" configured to see the product pass through it, and the system may determine the time it will take for the HHW product to reach the indicated bin. At the determined time, the system may control an actuator to rotate an arm across the conveyor to direct the HHW product into the identified bin. The system may record the product type and weight in a record associated with the bin.

When the bin reaches a pre-determined weight or number of items, the system may print a manifest, which may be affixed to the bin along with a bar code (a radio frequency identifier tag, another identifier, or any combination thereof) for easy electronic location of that manifest. In certain embodiments, the bin may be a bulk-size corrugated box, which may be attached to a pallet, and which may sometimes be referred to as a "Gaylord" box. Once the bin reaches the pre-determined weight or the pre-determined number of items, the bin may be sealed and may be shipped to an end user or to a least expensive disposal site.

In a particular example, the HHW products may include phosphate-based cleaners, which may be identified and grouped. The contents may be made available for sale and may be sold at a discount to an end user, such as a commercial laundry company. In another particular example, if a particular HHW bin include aqueous bleaches and there was no existing buyer, the bin of the HHW products could be shipped to a sewage treatment plant, where such bleach is currently used in their treatment of waste. In either case, the re-use would be better than burning for the environment and may reduce the cost of cleaning for the commercial laundry company and the cost of waste treatment at the sewage treatment plant.

In some embodiments, the optical sensor may include a bar code reader that may automatically read the bar code from the product packaging in response to detection of an item to be scanned. The presence of the product packaging may be detected by one or more sensors, such as a weight sensor, an optical sensor, a motion sensor, another automatic detection sensor, or any combination thereof. In some embodiments, the optical sensor may include a bar code reader having a trigger that can be pressed by a worker to scan the bar code on the HHW product packaging. The bar code reader may send the information to the processor, which may be configured to determine identification information associated with the HHW product based on the bar code information.

In certain embodiments, when the product bar code is not in the database of HHW product data, the system may emit a "REJECT" tone. In response to the tone, a worker may capture one or more optical data associated with the HHW product packaging. Alternatively or in addition, the system may cause one or more optical sensors to capture optical data associated with the HHW product packaging. In some embodiments, a third tone may be emitted to signify that the worker must remove the HHW product from the conveyor belt, and take a picture of the product. Upon successfully capturing an image, the system may emit a camera shutter sound (such as a click) or another sound that may be associated with successful capture of optical data. In some embodiments, after capturing the image data, another sound may signify that the worker should place the item back on the conveyor belt, and the item may travel along the conveyor belt and into a temporary storage bin configured to store unidentified HHW products. In an example, each HHW product may be associated with an unidentified item record that includes one or more pictures, a weight and stock-keeping unit (SKU) info (if any) in the database.

In certain embodiments, the system may provide an interface, such as a graphical user interface (GUI) that may be presented within an Internet browser application at a workstation within the recycling facility or at a remote workstation. An operator may interact with selectable elements within the GUI to update data associated with one or more unidentified HHW products. In certain embodiments, the GUI may present a table that displays the picture and SKU data. An operator may search various data sources, such as company websites, the Internet, databases and so on, in order to fill in the data record's blank fields. In certain embodiments, the user may access a tab or available fields to enter data in order to complete a data record for the selected HHW product. Once the record is completed (such that the previously unidentified HHW product is now identified and confirmed), the record may be appended to the database. Subsequently, the HHW product may be identified and sorted into a selected bin. Assuming one shift per day usage of the sorting machine, the re-sorting/re-categorization of the unidentified items from the previous shift may be the first step of each shift. Through this process, the newly-documented HHW products can be reprocessed to be categorized in their proper bins.

After a number of cycles in which an HHW product cannot be identified, the HHW product may be directed into a "Burn Bin" at the end of the conveyor belt. In certain embodiments, the uncompleted data records may be cold cases that provide opportunities for further investigation off-site. The nature and extent of this further investigation may vary, but manual laborers may be hired to review the optical data in order to append and eventually complete the record. In some embodiments, the review may be extended to the Internet, such as by inviting consumers to help identify such unidentified products. To incentivize the requested assistance, a reward may be offered to a first consumer who provides identifying information that can be confirmed. Other embodiments are also possible.

Figure 1:
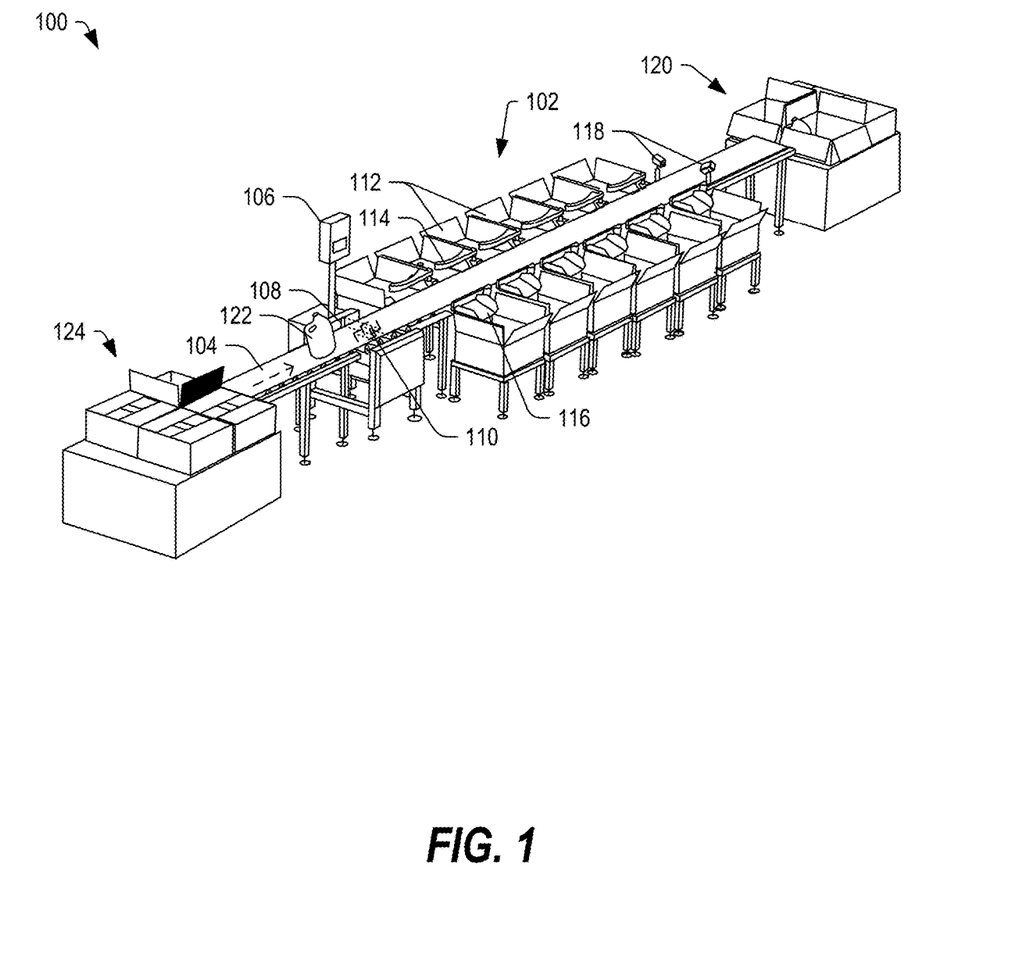
FIG. 1 is a perspective view of a system configured to identify and sort HHW products, in accordance with certain embodiments of the present disclosure.

FIG. 1 is a perspective view of a system 100 configured to identify and sort HHW products, in accordance with certain embodiments of the present disclosure. The system 100 may include a sorting system 102 configured to sort discarded products into an appropriate sorting bin. The system 100 may include a conveyor belt 104 configured to advance HHW products, such as the HHW product 122, past a bar code reader 108 associated with a sorting controller 106, which may optically scan the product using an optical device 108 (such as a bar code scanner, a camera, another type of optical sensor, or any combination thereof). The scan by the optical device 108 is generally indicated at 110. In certain embodiments, an optical device 108 may be provided on either side of the conveyor belt 104.

In certain embodiments, HHW items may be selected from bins 124 and may be placed on the conveyor belt 104. Such placement may be automated (such as by a robotic mechanism) or manual by employees of the waste processing center. The sorting controller 106 may use the bar code data to identify a product, determine a bin 112 into which the product should be routed, and control an actuator arm 114 to extend over the conveyor belt 104 to direct the HHW product 122 into the selected bin 112. Once the HHW product 122 is directed into the selected bin, the sorting controller 106 may send a signal to the actuator arm 114 to cause the actuator arm 114 to return to a resting state. Each actuator arm 114 and associated bin 112 may include a slide element 116, which may be a sloped structure configured to ease the delivery of the HHW product 122 into the bin 112.

In certain embodiments, sorting controller 106 may be unable to identify the HHW product 122 based on the optical data, and the sorting controller 106 may cause the conveyor belt 104 to advance the HHW product 122 past one or more optical sensors 118 configured to capture optical data associated with the HHW product 122. The conveyor belt 104 may then deliver the HHW product 122 to a temporary storage bin 120. In the illustrated example, multiple temporary bins 120 are shown.

In certain embodiments, when the sorting controller 106 cannot identify the HHW product, the optical data captured by the optical sensors 118 may be used to identify the HHW product 122. In certain embodiments, the optical data may include images including pictures of the packaging, product name data, bar code data, other data, or any combination thereof. In certain embodiments, the bar code data may not have been readable by the bar code readers 108 or may have been missing from an HHW product database accessible to the sorting controller 106 to sort the HHW product 122 into a suitable bin.

In certain embodiments, a processor may be configured to automatically search for similar shaped containers, product names, product labels, manufacturer names, SKU data, other information, or any combination thereof to identify the product and the corresponding composition of the HHW product. In certain embodiments, the results of the search may be presented within a GUI for review by an operator, who may populate a data record with such information so that subsequent scanning of a similar product will result in correct categorization of the product. In certain embodiments, HHW products in the temporary bin 120 may be re-processed so that they may be correctly categorized. Other embodiments are also possible.

Figure 2:
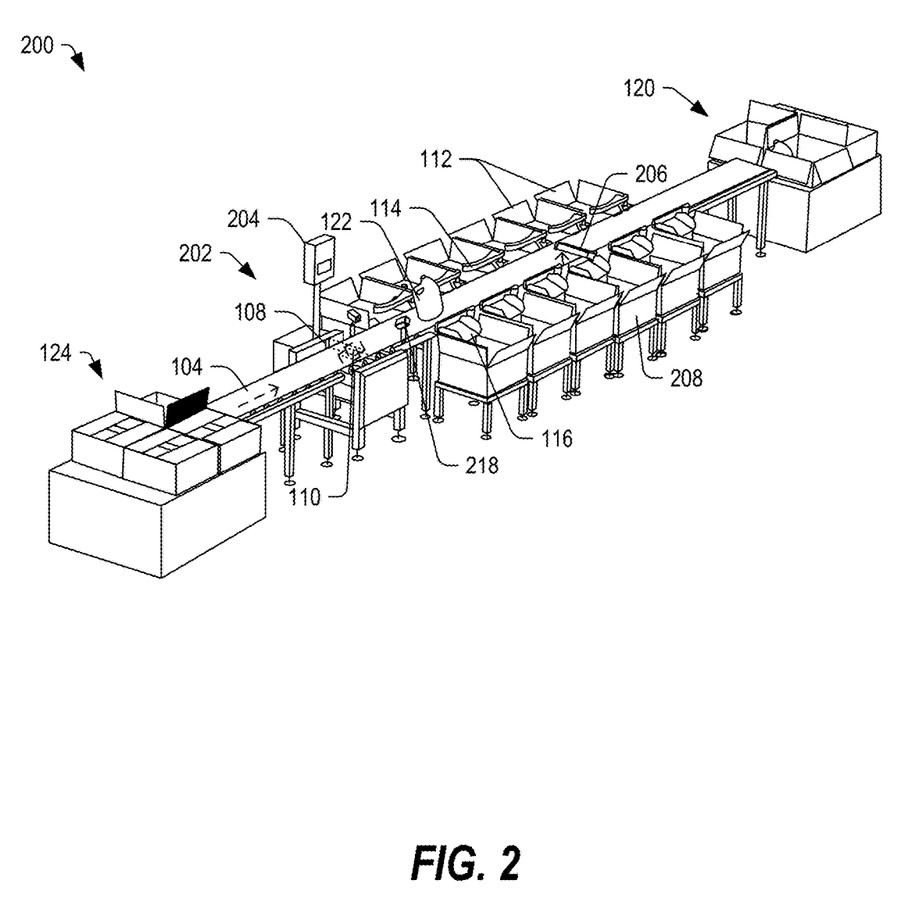
FIG. 2 is a perspective view of a system configured to identify and sort HHW products, in accordance with certain embodiments of the present disclosure.

FIG. 2 is a perspective view of a system 200 configured to identify and sort HHW products, in accordance with certain embodiments of the present disclosure. The system 200 may include all of the elements of the system 100 of FIG. 1, except that the optical sensors 118 are moved to a position that is closer to the sorting controller 106, providing a sorting apparatus 202. In certain embodiments, the sorting controller 106 may include the processing circuitry for searching for product information for unidentified or unrecognized HHW products. In the illustrated example, the sorting controller 204 may include the circuitry of sorting controller 106 as well as circuitry for controlling the optical sensors 218.

In the illustrated example, the HHW product 122 was recognized by the sorting controller 204, which controls the actuator arm 206 to extend over the conveyor belt in order to sweep the HHW product into the bin 208. If the HHW product 122 was not recognized by the sorting controller 204, the sorting controller 204 may control the optical sensors 218 to capture optical data associated with the HHW product 122 before advancing the HHW product into the temporary bin 120. The optical data may then be used to attempt to assemble (automatically or manually) product information corresponding to the HHW product 122.

In one embodiment, the optical sensors 218 may be positioned after a scale in a direction of the movement of the conveyor belt 104. In another embodiment, the optical sensors 218 may be located just before the scale, adjacent to the scale, or at other locations before the conveyor belt 104 or along the path of the conveyor belt 104, depending on the implementation. Other embodiments are also possible.

The examples of FIGS. 1 and 2 depict automated systems that include a conveyor belt 104 and a sorting controller 106 or 204 configured to send control signals to actuator arms 114 to selectively extend or retract a selected one of the actuator arms 114 to direct the HHW product 122. In an alternative embodiment, the sorting may be at least partially manual, and the sorting controller 106 and 204 may illuminate a light or activate another indicator associated with a selected bin to direct a worker to place the HHW product in the selected bin. Other embodiments are also possible.

Figure 3:
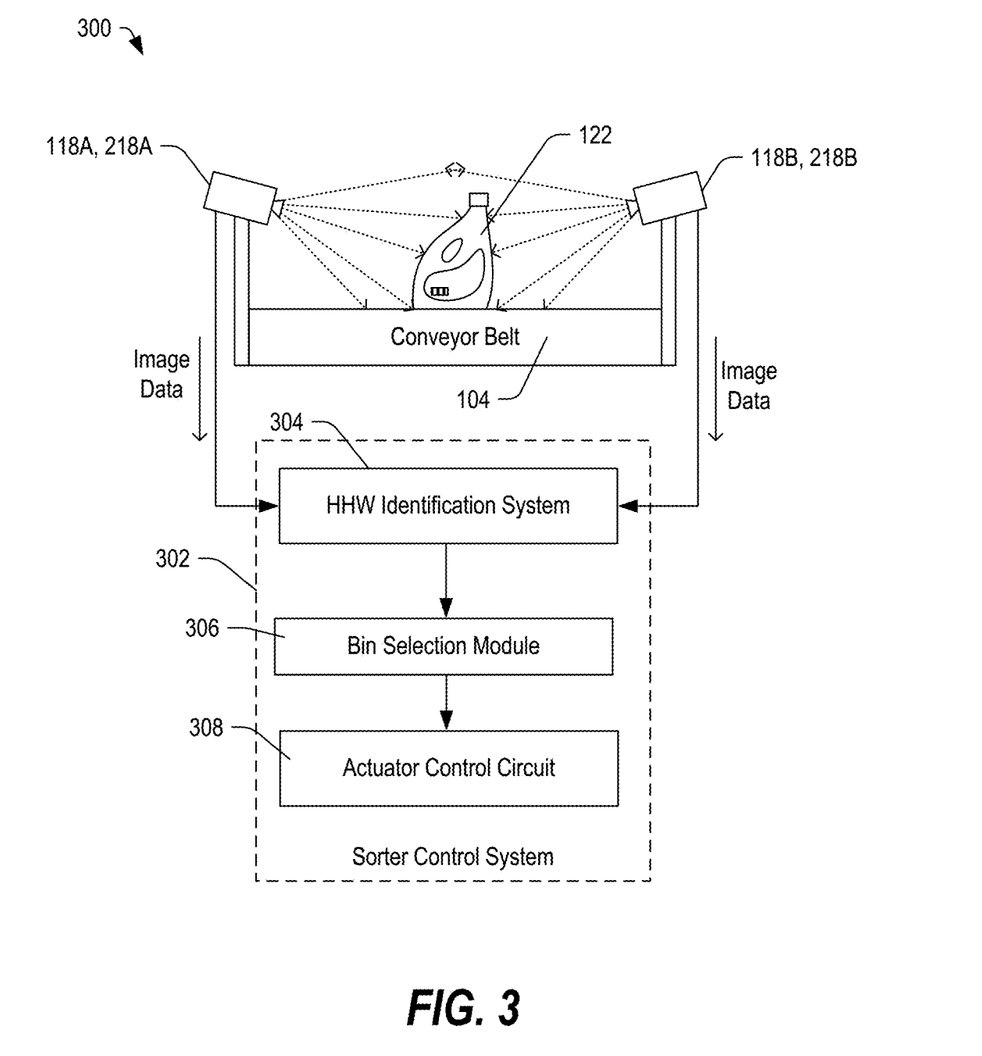
FIG. 3 is a block diagram of a portion of a system configured to identify and sort HHW products, in accordance with certain embodiments of the present disclosure.

FIG. 3 is a block diagram of a portion 300 of a system configured to identify and sort HHW products, in accordance with certain embodiments of the present disclosure. The portion 300 may be part of the system 100 of FIG. 1 or the system 200 of FIG. 2. The portion 300 includes the optical sensors 118A and 118B or 218A and 218B, for example, which may be positioned adjacent to the conveyor belt 104 to capture optical data associated with the HHW product 122.

The optical sensors 118 or 218 may be coupled to a sorter control system 302, which may include an HHW identification system 304 configured to determine identifying information about the HHW product 122 based on the optical data. The sorter control system 302 may further include a bin selection module 306 configured to determine a suitable bin for an HHW product 122 based on the identifying information. The sorter control system 302 may further include an actuator control circuit 308 configured to control at least one actuator arm 114 to extend across the conveyor belt 104 to sweep the HHW product 122 into the selected bin.

In certain embodiments, the HHW identification system 304 may include optical sensors (bar code readers, cameras, other optical sensors, or any combination thereof). Further, the HHW identification system 304 may include processing circuitry configured to process the optical data and to attempt to identify the HHW product based on the optical data. In some embodiments, the processing circuitry may search the Internet, one or more databases, other data sources, or any combination thereof. In certain embodiments, the processing circuitry may generate a report including optical data (such as images) and other data (such as data appended to the images, data determined from the optical data, or any combination thereof) and may provide the report to one or more operators, a social media website, another site, or any combination thereof. In some embodiments, the system may host a website to encourage consumers to identify such unidentified products, and data collected from the operators, users, consumers, websites, and so on may be used to determine the product composition. Once determined, the information may be presented to an administrator or operator for review and confirmation. If confirmed, the data record for the HHW product may be appended to the database so that subsequent scans may be able to identify the product and the sorter control system 304 may sort the HHW product into the appropriate bin. Other embodiments are also possible.

Figure 4:
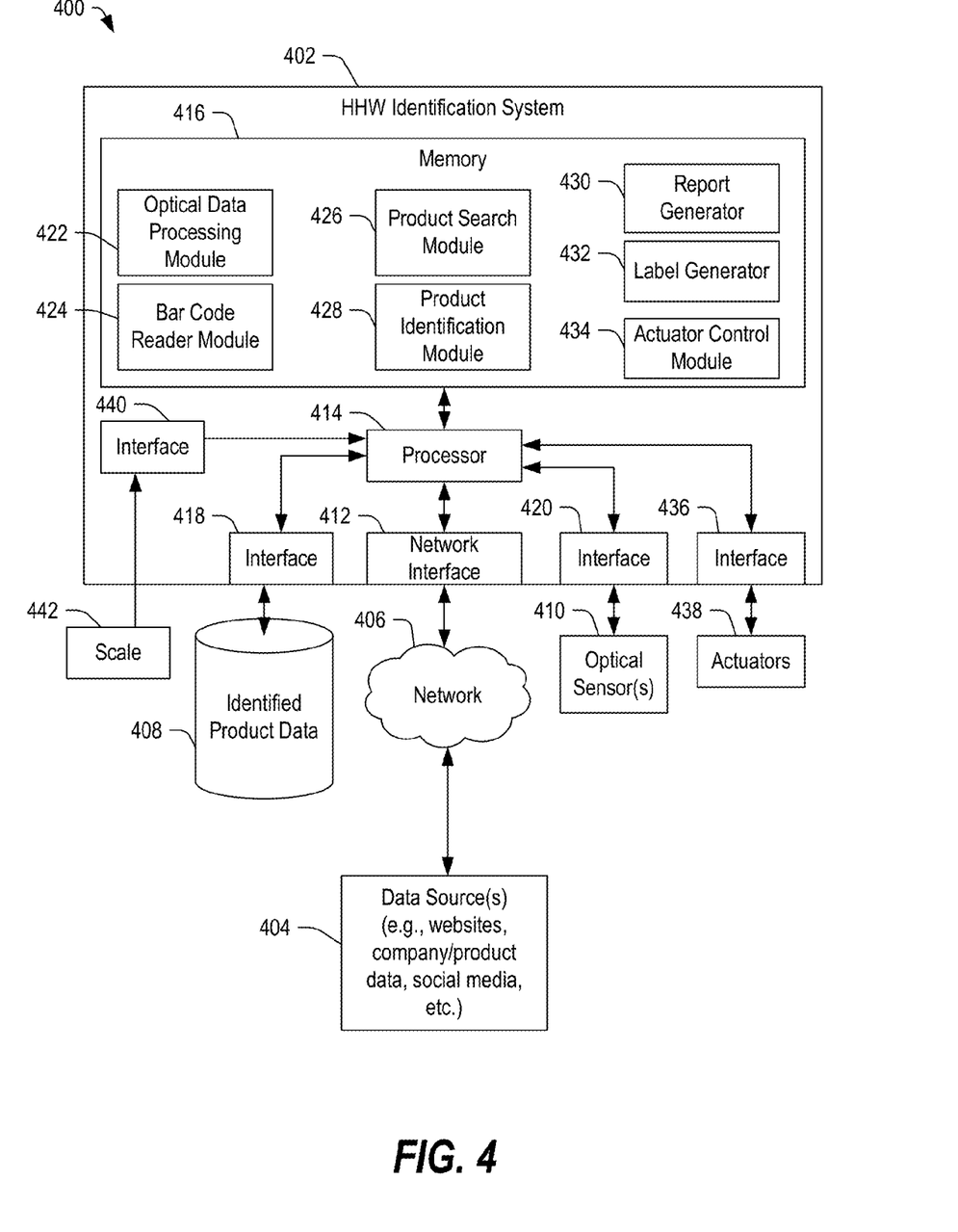
FIG. 4 is a block diagram of a system configured to identify and sort HHW products, in accordance with certain embodiments of the present disclosure.

FIG. 4 is a block diagram of a system 400 configured to identify and sort HHW products, in accordance with certain embodiments of the present disclosure. The system 400 may include elements of the system 100 of FIG. 1, the system 200 of FIG. 2, and the portion 300 of FIG. 3. The system 100 may include an HHW identification system 402 configured to communicate with one or more data sources 404 through a network 406. The data sources 404 may include websites, company data, product data, social media data, other data, or any combination thereof. Further, the HHW identification system 402 may communicate with a database 408 including identified product data, one or more optical sensors 410, and one or more actuators 438 (or actuator control circuits).

The HHW identification system 402 may include a network interface 412, which may communicate with the network 406, and may include a processor 414 coupled to the network interface 412. Further, the processor 414 may be coupled to the database 408 through an interface 418, to the optical sensors 410 through an interface 420, and to the one or more actuators 438 through an interface 436. The processor 414 may also be coupled to a memory 416, which may store data and processor-readable instructions. The memory 416 may include a hard disc drive, a flash drive, cache memory, optical storage devices (such as compact discs (CDs) and digital video discs (DVDs)), other non-volatile storage devices, or any combination thereof.

The memory 416 may include an optical data processing module 422 that, when executed, may cause the processor 414 to process the optical data, to extract the bar code information, to extract label information (such as a product identifier, a manufacturer, product data, or any combination thereof), to extract image data, or any combination thereof. In some embodiments, the optical data processing module 422 may cause the processor 414 to perform optical character recognition (OCR) on the product label to extract text information from the optical data. The memory 416 may also include a bar code reader module 424 that, when executed, may cause the processor 414 to control one or more bar code readers to scan bar code data associated with packaging of an HHW product. In certain embodiments, the bar code reader module 424 may cause the processor 414 to determine a bar code from bar code data received from the optical data processing module 422.

The memory 416 may further include a product search module 426 that, when executed, may cause the processor 414 to search the database 408 and the one or more data sources 404 based on information determined from the optical data, the bar code data, or any combination thereof. The memory 416 may include a product identification module 428 that, when executed, may cause the processor 414 to identify the HHW product based on the optical data, the bar code data, and retrieved data from the database 408, the data sources 404, or any combination thereof. In certain embodiments, the product identification module 428 may further cause the processor 414 to determine a bin in which to place an identified HHW product so that products having similar chemical compositions may be grouped together.

The memory 416 may also include a report generator 430 that, when executed, may cause the processor 414 to generate an interface (such as a graphical user interface or GUI), which may include data corresponding to one or more unidentified HHW products, optical data associated with the HHW products, data from the one or more data sources 404, product data from the database 408, other data, or any combination thereof. The report generator 430 may cause the processor 414 to provide the GUI to a destination device, such as a smart phone, a laptop computer, or another computing device. The destination device may be operated by a user, such as an administrator, an operator, or another type of user. The user may interact with the GUI via the destination device to review the HHW data and to update the record of a selected HHW product.

In certain embodiments, the memory 432 may include a label generator 432 that, when executed, may cause the processor 414 to determine when a bin of a particular HHW product is full (by weight, number of product items, another factor, available bin space, or any combination thereof) and to generate a manifest for a particular bin of HHW products having a similar composition when the bin is full. The memory 416 may also include an actuator control module 434 that, when executed, may cause the processor 414 to provide a control signal to one or more actuators 438 to selectively adjust a rotational position (extended or retracted position) of an actuator arm (such as the actuator arms 114 and 206 in FIGS. 1 and 2, respectively) to direct an HHW product to a selected bin.

In certain embodiments, the product search module 426 and the product identification module 428 may cooperate to cause the processor 414 to automatically attempt to identify the HHW product from the optical data. In certain embodiments, the product search module 426 may search available data sources to identify associated product information. The product identification module 428 may attempt to correlate the product information with the optical data and other data. Further, the product identification module 428 may interact with the report generator 430 to produce an output GUI that may be presented to an operator for verification.

In certain embodiments, the HHW identification system 402 may include an interface 440 coupled to the processor 414. The interface 440 may be coupled to a scale 442, which may be associated with the conveyor system in order to weigh HHW products. In certain embodiments, the processor 414 may correlate the weight to the optical data of an HHW product and the weight may be correlated to an identified product, when the processor 414 can determine the product based on the optical data.

In some embodiments, the product identification module 428 may utilize data determined from the optical data to search various data sources, for example, via the Internet. In some embodiments, the product identification module 428 may interact with one or more websites to search or to post information about an unidentified HHW product to solicit information from consumers. For example, identifying data may be received from one or more social media websites, which may be in response to a request for information including a report about the HHW product. Some social media participants may find it an interesting challenge to identify such products based on image data, and may provide data that can be used to identify the HHW product. In some embodiments, the challenge may be instituted with a prize to entice users to assist in identifying the HHW product, where the prize may be awarded to the user that provides usable and verifiable information. Other embodiments are also possible.

Figure 5:
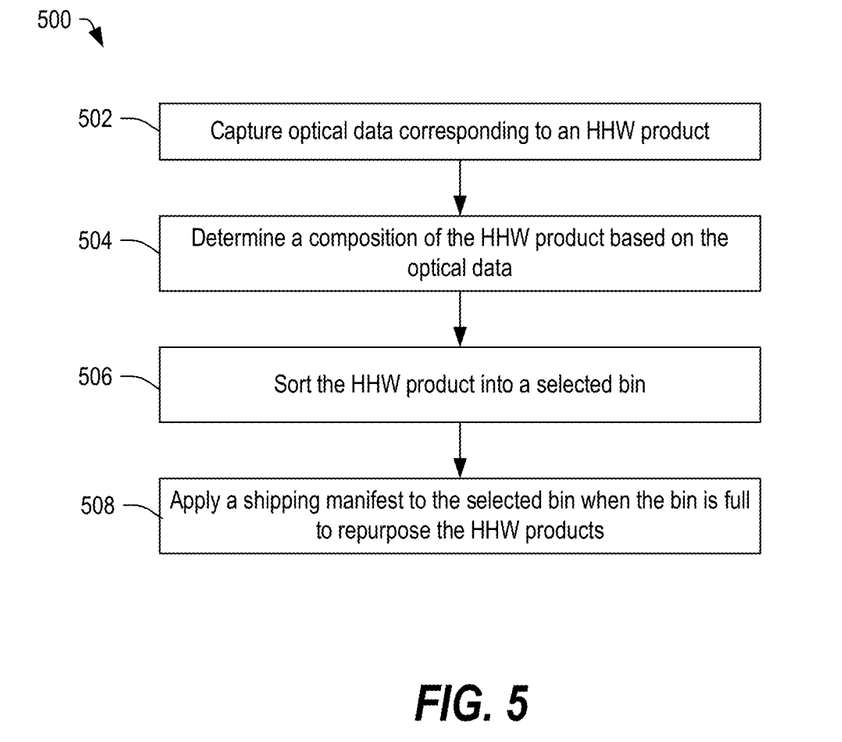
FIG. 5 is a flow diagram of a method of recovering an HHW product for repurposing, in accordance with certain embodiments of the present disclosure.

FIG. 5 is a flow diagram of a method 500 of recovering an HHW product for repurposing, in accordance with certain embodiments of the present disclosure. At 502, the method 500 may include capturing optical data corresponding to an HHW product. The optical data may be captured by one or more optical sensors positioned adjacent to a conveyor belt. In some embodiments, the one or more optical sensors can include a portable camera, a moveable camera, one or more fixed cameras, bar code scanners, other optical sensors, or any combination thereof.

At 504, the method 500 may include determining a composition of the HHW product based on the optical data. In certain embodiments, the process of determining the composition may include a variety of operations. In an embodiment, the composition may be determined by looking up the HHW product in a database based on data extracted from the optical data, including a bar code, a product name, a company name, a shape of the packaging, other data, or any combination thereof. In some embodiments, the composition may be determined by generating a report including the optical data and other data and sending the report to a manufacturer (or seller) of the product requesting product details. The composition may then be determined based on the response from the manufacturer. In some embodiments, the composition may be determined from research performed by an operator, by a search automatically performed based on the optical data, from another source, or any combination thereof.

At 506, the method 500 may include sorting the HHW product into a selected bin. In certain embodiments, the HHW product may be sorted into a bin of similar products. In an example, bleach products may be sorted into a first bin, while phosphate-based laundry detergents may be sorted into a second bin, and so on.

At 508, the method 500 may include applying a shipping manifest to the selected bin when the bin is full to repurpose the HHW products. In certain embodiments, each HHW product may be weighed and identified before the HHW product is directed into a particular bin. When the bin reaches a pre-determined weight, when the bin is full (based on area) or when the bin has a pre-determined number of items, the manifest may be generated.

Figure 6:
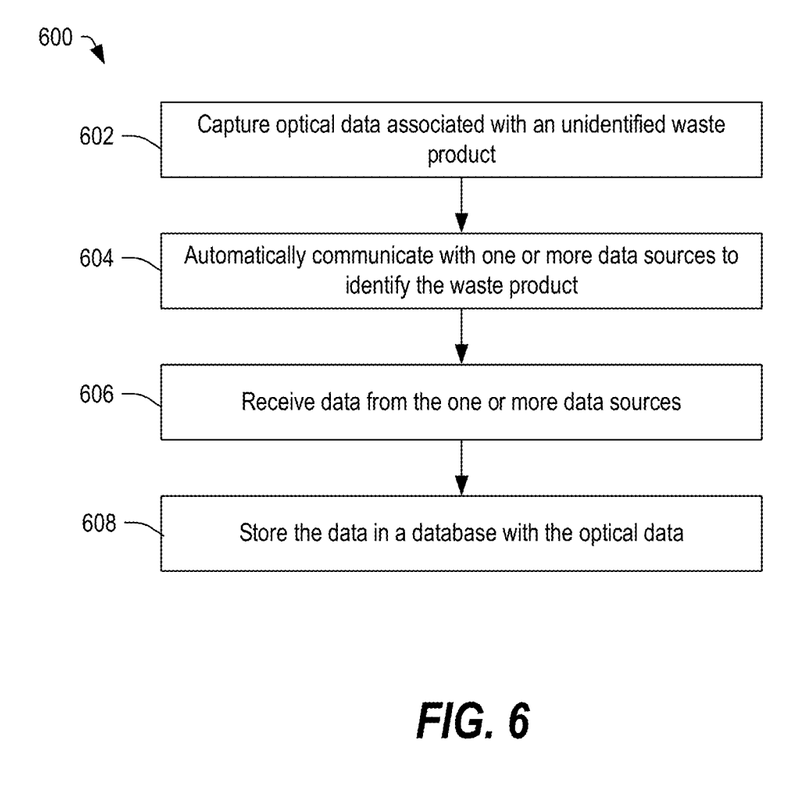
FIG. 6 is a flow diagram of a method of identifying an HHW product, in accordance with certain embodiments of the present disclosure.

FIG. 6 is a flow diagram of a method 600 of identifying an HHW product, in accordance with certain embodiments of the present disclosure. At 602, the method 600 may include capturing optical data associated with an unidentified waste product. At 604, the method 600 may further include automatically communicating with one or more data sources to identify the waste product. The one or more data sources may include websites, company data, product data, social media websites, other sources, or any combination thereof. In certain embodiments, the system may process the optical data to perform optical character recognition (OCR) to extract text data, which may be used to search the data sources.

At 606, the method 600 may include receiving data from the one or more data sources. The data may include images, text, documents in various formats, or any combination thereof. Further, the data may be used to identify the HHW product. In certain embodiments, the received data, the images, and other information may be provided within a GUI to an operator to verify the identification.

At 608, the method 600 may include storing the data in the database with the optical data. In certain embodiments, the stored data may include a verified identification of the HHW product. In some embodiments, the retrieved data and the images may be stored for later retrieval and verification. Other embodiments are also possible.

Figure 7:
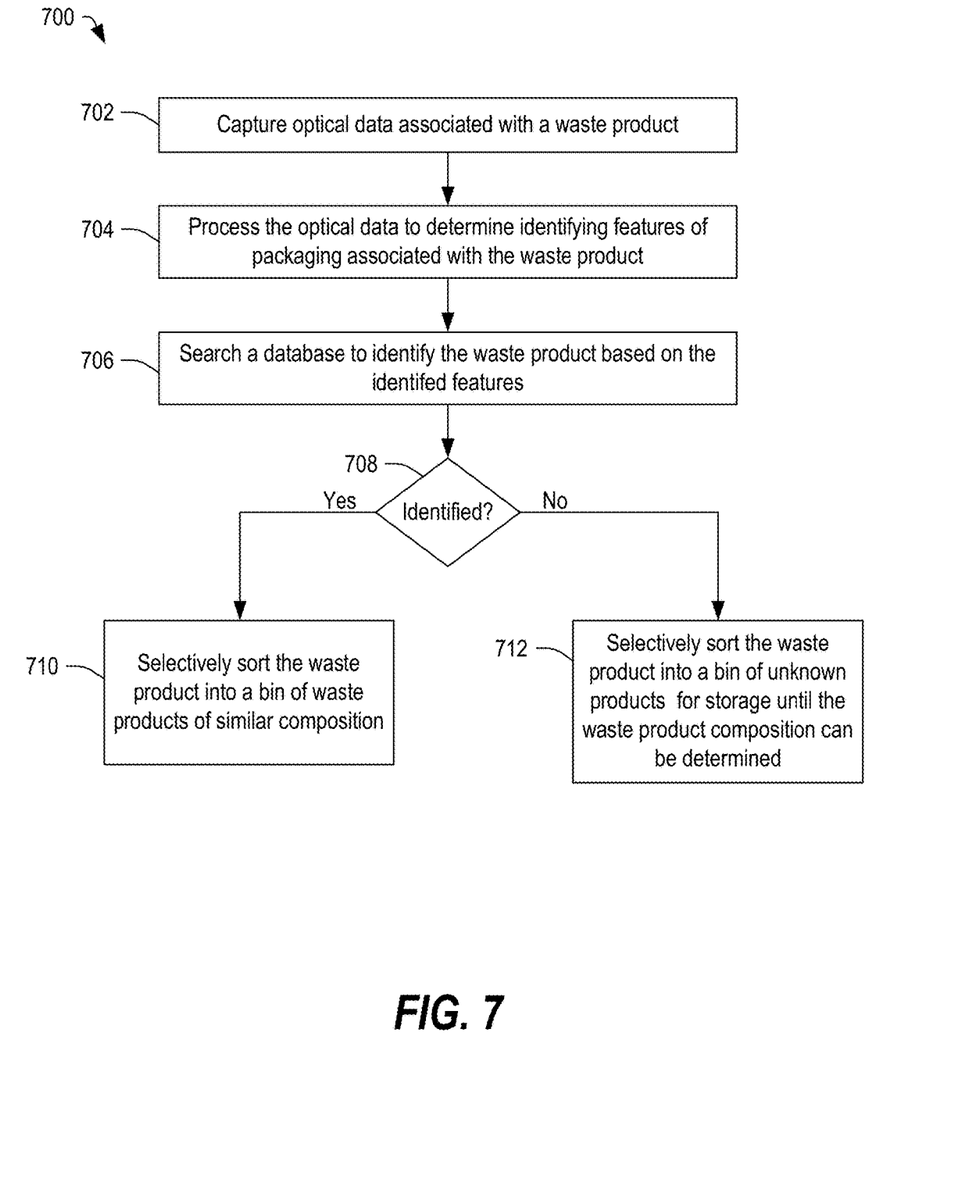
FIG. 7 is a flow diagram of a method of selectively sorting an HHW product based on image data, in accordance with certain embodiments of the present disclosure.

FIG. 7 is a flow diagram of a method 700 of selectively sorting an HHW product based on image data, in accordance with certain embodiments of the present disclosure. At 702, the method 700 may include capturing optical data associated with a waste product. At 704, the method 700 may include processing the optical to determine identifying features of the packaging associated with the waste product. In certain embodiments, the identified features may include a bar code, text from the label, a shape of the bottle, other data, or any combination thereof.

At 706, the method 700 may include searching a database to identify the waste product based on the identified features. At 708, if the waste product is identified, the method 700 may include selectively sorting the waste product into a bin of waste products of similar composition, at 710. Otherwise, at 708, if the waste product is not identified, the method 700 may include selectively sorting the waste product into a bin of unknown products for storage until the waste product composition can be determined, at 712.

Figure 8:
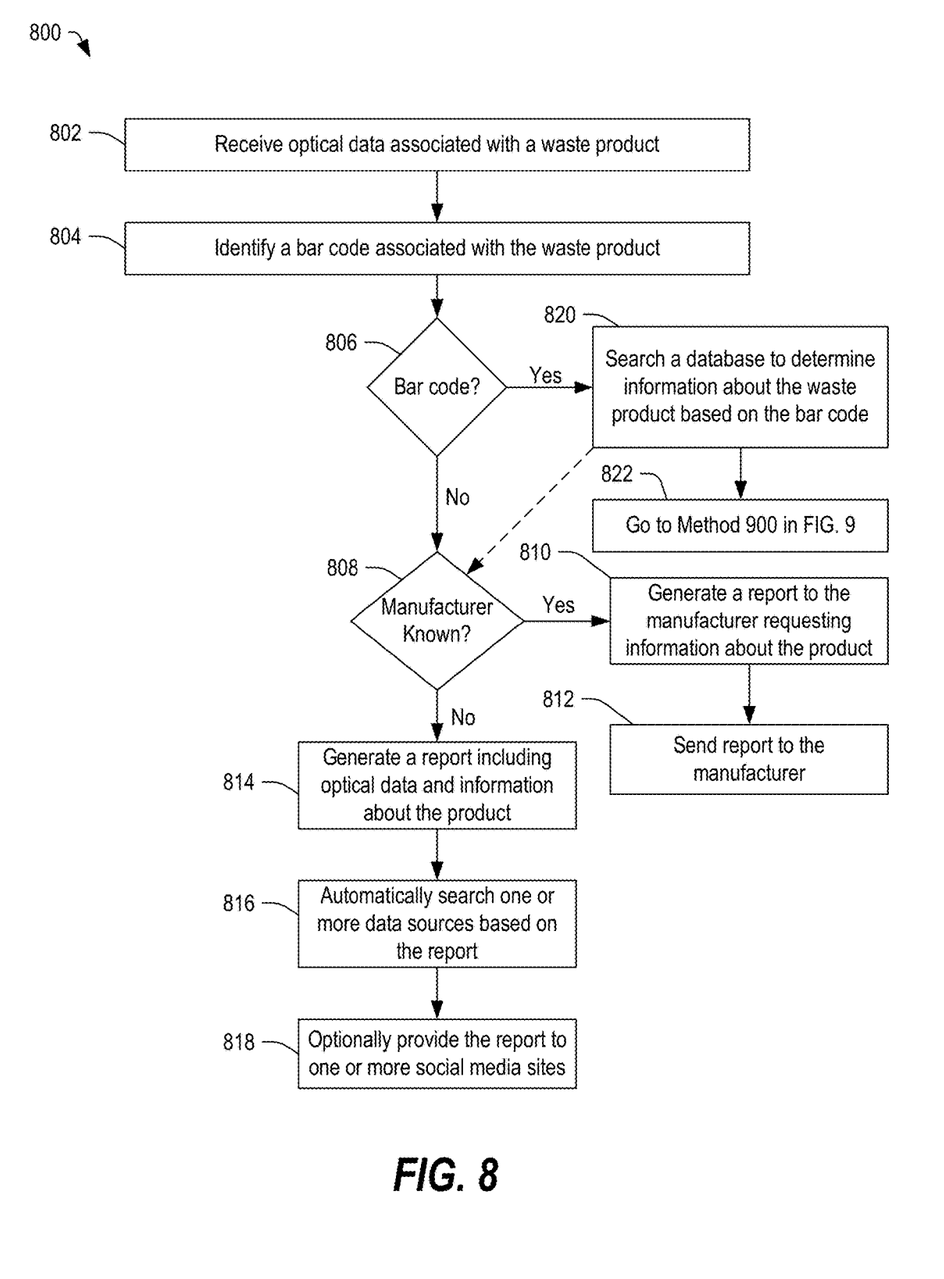
FIG. 8 is a flow diagram of a method of determining an HHW product, in accordance with certain embodiments of the present disclosure.

FIG. 8 is a flow diagram of a method 800 of determining an HHW product, in accordance with certain embodiments of the present disclosure. At 802, the method 800 may include receiving one or more optical data associated with a waste product. At 804, the method 800 may include identifying a bar code associated with the product. In some examples, the bar code may be identified from the optical data. The bar code may then be used to search one or more databases, websites, documents, or any combination thereof.

At 806, if the bar code is not known, the method 800 may include determining whether the manufacturer is known, at 808. The manufacturer may be determined from an optical character recognition operation performed on the optical data. If the manufacturer is known, the method 800 may include generating a report to the manufacturer requesting information about the product, at 810. At 812, the method 800 may further include sending the report to the manufacturer. The manufacturer may respond with data about the product, which may be appended to a database record corresponding to the product.

Returning to 808, if the manufacturer is not known or cannot be determined (such as if the product label is torn or removed), the method 800 may include generating a report including optical data (such as product images) and information about the product, at 814. Such information may include any data that can be determined from the optical data or by employees. At 816, the method 800 may include automatically searching one or more data sources based on the report. The one or more data sources may include websites, databases, social media sites, other data sources, or any combination thereof. At 818, the method 800 may include optionally providing the report to one or more social media sites. As discussed above, it may be possible to entice consumers to try to solve the puzzle of the unidentified product. In some embodiments, a bounty may be offered to pay for information about the unidentified product, provided such information can be verified.

In certain embodiments, data received from the one or more data sources or determined from the social media sites may be aggregated and provided in a report to an operator, who may evaluate the veracity of the data to identify the product. Other embodiments are also possible.

Returning to 806, if a bar code is available, the method 800 may include searching a database to determine information about the waste product based on the bar code, at 820. The method 800 may then include, at 822, advancing to the method 900 in FIG. 9.

Figure 9:
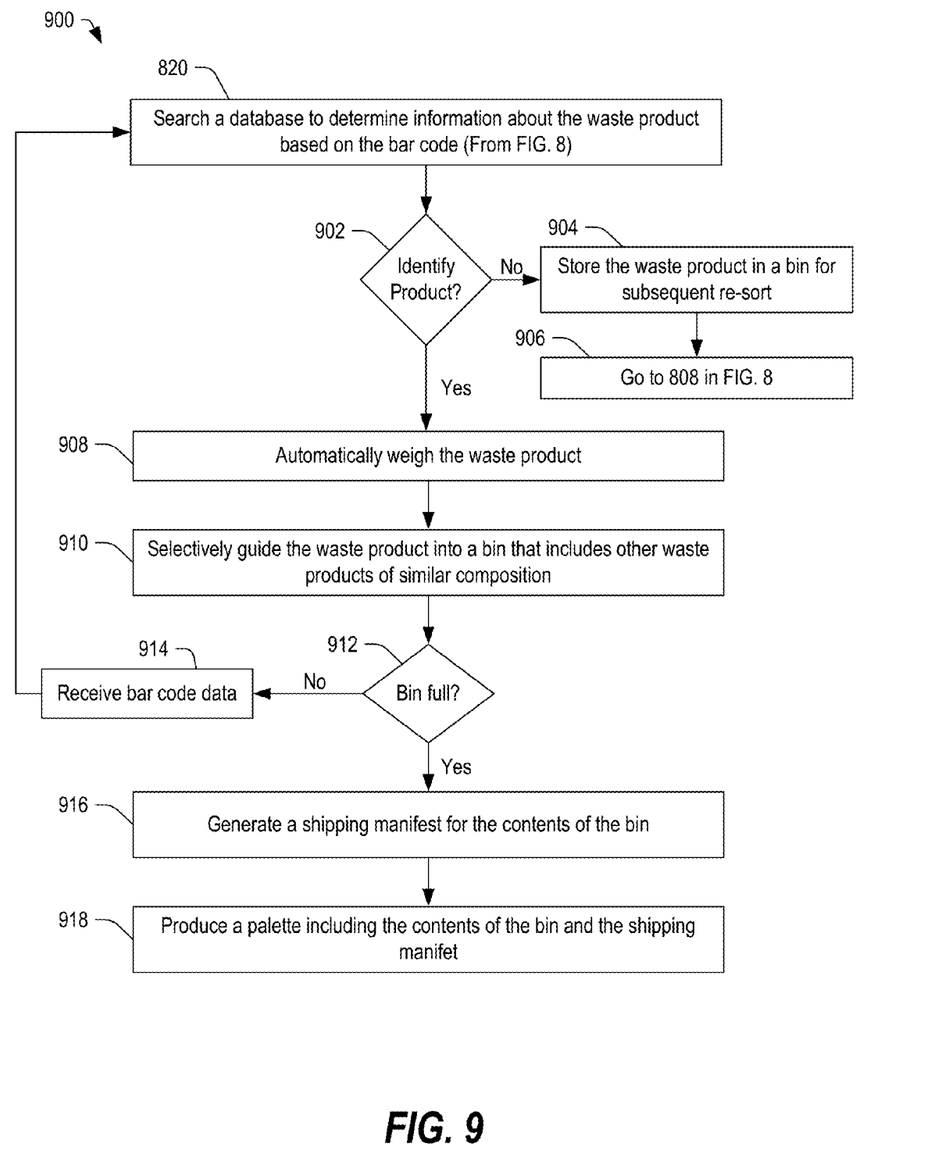
FIG. 9 is a flow diagram of a method of recovering HHW products for repurposing, in accordance with certain embodiments of the present disclosure.

FIG. 9 is a flow diagram of a method 900 of recovering HHW products for repurposing, in accordance with certain embodiments of the present disclosure. At 820, the method 900 may include searching a database to determine information about the waste product based on the bar code. At 902, if the product is not identified based on the database search, the method 900 may include storing the waste product in a bin for a subsequent re-sort. The method 900 may then include, at 906, advancing to 808 in FIG. 8.

Returning to 902, if the product is identified, the method 900 may include automatically weighing the waste product, at 908. At 910, the method 900 may include selectively guiding the waste product into a bin that includes other waste products of similar composition.

At 912, the method 900 includes determining if the bin is full. The bin may be full if the bin includes a pre-determined number of items, if the bin has reached a pre-determined weight, if some other pre-determined parameter is met, or any combination thereof. If the bin is not full at 912, the method 900 includes receiving bar code data, at 914. The method 900 then returns to 820 to search the database.

Otherwise, at 912, if the bin is full, the method 900 may include generating a shipping manifest for the contents of the bin, at 916. The method 900 may further include producing a palette including the contents of the bin and including the shipping manifest, at 918.

In certain embodiments, the devices, systems, and methods discussed above with respect to FIGS. 1-9 make it possible to intercept household waste items before they are classified as hazardous based on optical data captured from the product packaging. These items may then be categorized with other similar products to produce a bin of similar products that can be re-purposed or otherwise diverted from an expensive disposal option to a cheaper option by identifying the product composition from the information derived from the product packaging (either directly, by searching a database, or by search other data sources).

Figure 10:
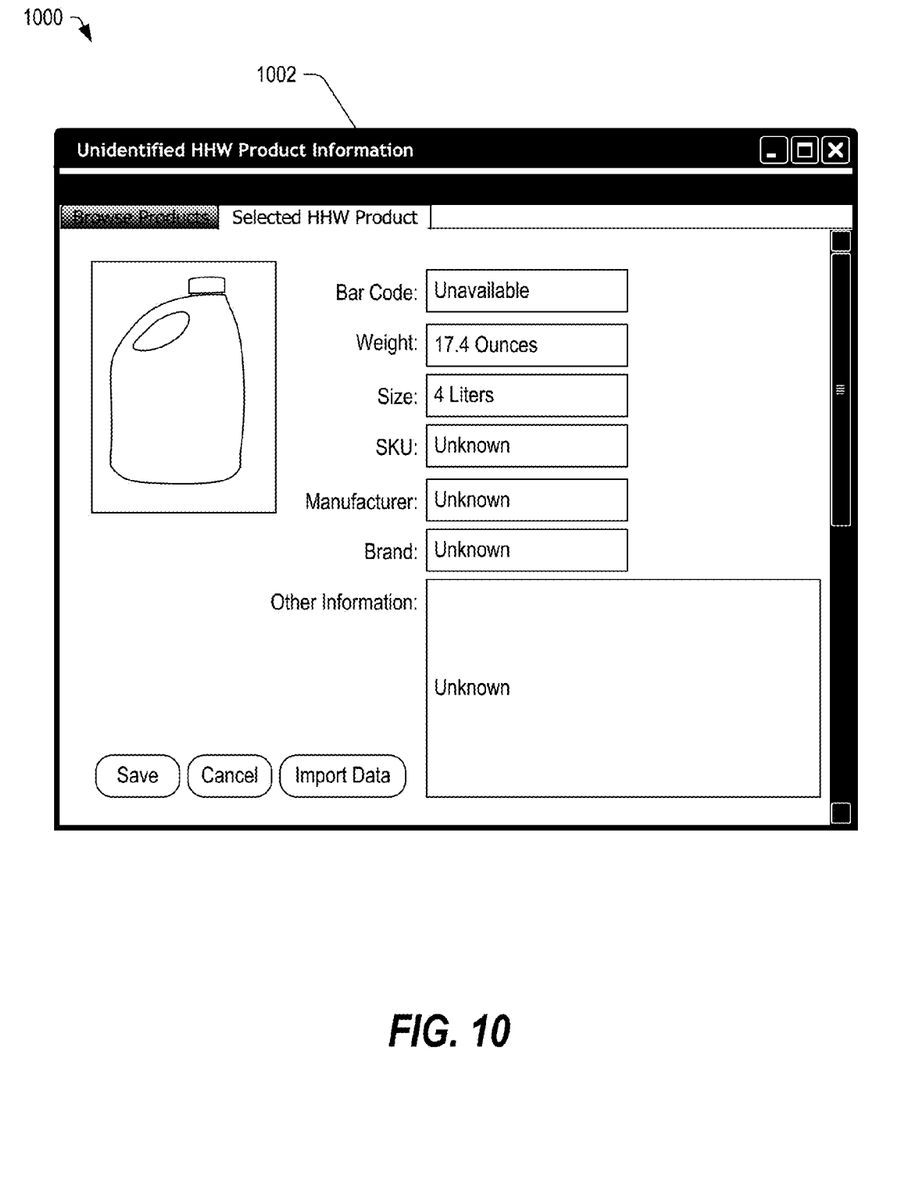
FIG. 10 is a diagram of an interface for identifying an unknown HHW product for repurposing, if possible, in accordance with certain embodiments of the present disclosure.

FIG. 10 is a diagram 1000 of an interface 1002 for identifying an unknown HHW product for repurposing, if possible, in accordance with certain embodiments of the present disclosure. The interface 1002 may include image data, text data, and user-selectable options accessible by a user to select a product and to update the product information. The user may import data by selecting an "Import Data" button and/or may update text fields with information about an HHW product, such as bleach. Changes may then be saved by selecting a "Save" button or may be canceled by selecting a "Cancel" button.

In some embodiments the interface 1002 may include one or more selectable tabs. In one example, the interface 1002 may include a "Browse Products" tab and may include a "Selected HHW Product" tab. The user may select a product by interacting with the "Browse Products" tab and may update the product information using the fields and selectable options available in the "Selected HHW Product" tab.

While the example of FIG. 10 shows buttons, tabs, and text fields, in certain embodiments, the interface 1002 may include clickable links, pull-down menus, check boxes, radio buttons, other user-selectable options, or any combination thereof. In certain embodiments, the interface 1002 may be rendered within an Internet browser application. In other embodiments, the interface 1002 may be rendered as a part of a stand-alone software application. Other embodiments are also possible.

In conjunction with the systems, methods, devices, and GUIs described above with respect to FIGS. 1-10, some HHW products may be intercepted and repurposed or redirected from an expensive burning disposal process to another use or another process. In certain embodiments, optical sensors may capture optical data associated with an HHW product, and the optical data may be processed to identify information about the HHW product. In certain embodiments, the optical data may be automatically processed to identifying the information. In certain embodiments, the optical data may be presented in a GUI to an operator to allow a user to update the data record to identify the HHW product based on the optical data or other data. Other embodiments are also possible.

The processes, machines, and manufactures (and improvements thereof) described herein are particularly useful improvements for processing household hazardous waste products. Further, the embodiments and examples herein provide improvements in the technology of HHW sorting systems. In addition, embodiments and examples herein provide improvements to the functioning of a waste sorting system by processing optical data associated with unknown or unidentified products to identify HHW products so that product information can be determined, such as the HHW product's chemical composition, thereby creating a specific purpose computing device by adding such technology. Thus, the improvements herein provide for technical advantages, such as providing a system in which HHW products can be identified based on optical data and can be diverted from burning and optionally repurposed or sold. In certain embodiments, the identified products can be diverted to a less expensive disposal option as compared to burning. While technical fields, descriptions, improvements, and advantages are discussed herein, these are not exhaustive and the embodiments and examples provided herein can apply to other technical fields, can provide further technical advantages, can provide for improvements to other technologies, and can provide other benefits to technology. Further, each of the embodiments and examples may include any one or more improvements, benefits and advantages presented herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments, blocks may be removed or combined without departing from the scope of the disclosure. Further, structural and functional elements within the diagram may be combined, in certain embodiments, without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
   a plurality of optical sensors configured to capture optical data associated with packaging of a container of a product of an unknown type that was previously discarded, the optical data including at least one image of the container;
   a scale configured to determine a weight of the container; and
   a processor coupled to the plurality of optical sensors and the scale, the processor to:
   determine information about the product based on the optical data by searching one or more data sources to automatically determine a composition of the product within the container;
   selectively sort the container into a selected bin of a plurality of bins based on the composition, the selected bin configured to store a plurality of containers, each of the plurality of containers containing a composition corresponding to the composition of the product;
   add the weight of the container to a weight associated with the selected bin; and
   send a signal corresponding to one of a destination device and a controller based on the determined information.

2. The system of claim 1, further comprising an actuator control circuit coupled to the processor and configured to adjust a position of an actuator arm in response to the signal to direct the container into the selected bin.

3. The system of claim 1, further comprising:
   a memory coupled to the processor and configured to store data about each of the plurality of bins including information about each of the containers stored in each of the plurality of bins; and
   wherein the information includes the weight of each of the containers.

4. The system of claim 1, wherein the processor is configured to automatically determine the information by processing the optical data to extract text data and by searching one or more data sources based on the extracted text data.

5. The system of claim 4, wherein the processor is configured to generate a graphical user interface (GUI) including the information and at least a portion of the optical data and to provide the GUI to a destination device to allow an operator to verify the information.

6. The system of claim 1, wherein the processor is configured to generate a graphical user interface (GUI) including data about the container and the product, the GUI including at least a portion of the optical data and including text data, the GUI including one or more user-selectable options accessible by a user to update the data associated with the waste product.

7. A device comprising:
   one or more optical sensors configured to capture optical data associated with a container of a waste product previously disposed of as household hazardous waste, the optical data including an image of the container including packaging applied to the container;
   a scale configured to determine a weight of the container;
   a memory configured to store identification data associated with a plurality of household hazardous waste products and to store processor-executable instructions; and
   a processor coupled to the scale, the one or more optical sensors, and to the memory, the processor to execute the processor-executable instructions to:
   determine product data from the optical data associated with one of a shape of the container and the packaging and to search one or more data sources to identify a composition of the waste product within the container based on the product data,
   capture images of the of the container and the packaging in response to failure of the identification and to generate an output signal configured to control a sorting operation to store the container into a selected bin of products of unknown compositions for subsequent sorting,
   receive updated data identifying the composition of the waste product from a data source;
   selectively redirect the container from the selected bin of products of unknown compositions to a second selected bin of products of compositions similar to the composition of the product based on the updated data; and
   add the weight of the container of the waste product to a weight associated with the second selected bin.

8. The device of claim 7, wherein the processor is further configured to:
   automatically generate a graphical user interface including at least a portion of the optical data and other data about the waste product; and
   send the graphical user interface to a destination device.

9. The device of claim 7, wherein the processor is configured to perform optical character recognition operations on the optical data to determine text data from the container that is associated with the waste product.

10. The device of claim 7, wherein the processor is configured to determine bar code data from the optical data and to search a database for the bar code data to identify the waste product.

11. The device of claim 7, wherein the processor is configured to generate a report including the optical data and at least one of text data derived from the optical data and text data provided by an operator.

12. The device of claim 11, wherein the device further includes a network interface configured to communicate data to a destination device through a communications network.

13. The device of claim 12, wherein the processor is further configured to send the report to the destination device through the communications network.

14. The device of claim 7, wherein the processor is configured to receive information corresponding to the waste product from one or more data sources, to correlate the received information to the one or more images, and to append the identification data in the memory to include at least a portion of the one or more images and the received information.

15. The device of claim 14, wherein the processor is configured to receive optical data corresponding to the container and the waste product and to sort the the container into a selected storage bin based on the received optical data.

16. The device of claim 15, wherein the processor is configured to determine a weight of the selected storage bin based on the weight of each container stored within the selected storage bin, and to generate a shipping manifest for the selected storage bin.

17. The device of claim 16, wherein the processor generates the shipping manifest when a total weight of the selected storage bin is greater than a pre-determined threshold.

18. A system comprising:
an interface configured to communicate with a network;
one or more optical sensors configured to capture optical data associated with packaging of a container of a product of unknown composition that was previously disposed of as household hazardous waste;
a scale configured to determine a weight of the container;
a processor coupled to the interface, the scale, and the one or more optical sensors; and
a memory accessible to the processor and configured to store instructions that, when executed, cause the processor to:
  determine information about the product based on the optical data by searching optical information corresponding to a plurality of household hazardous waste products in a database to identify a match based on a shape of the container;
  retrieve information related to a composition of the product within the container from the database in response to identifying the match;
  selectively sort the container into one of a first bin of products of similar composition into a second bin of products of unknown composition based on a result of the search; and
  add the weight of the container of the waste product to a weight associated with the one of the first bin and the second bin.

19. The system of claim 18, wherein the memory further includes instructions that, when executed, cause the processor to:
  perform optical character recognition operations on the optical data to determine text data;
  automatically search one or more data sources based on the text data to determine composition data; and
  automatically update the database to include the optical data and the composition data.

20. The system of claim 19, wherein, after updating the database, the instructions may cause the processor to redirect the container from the second bin of products of unknown composition to a selected bin of products of compositions similar to a composition of the product based on the composition data, the selected bin selected from a plurality of bins including the second bin.

* * * * *